US009003716B1

(12) United States Patent
Gill et al.

(10) Patent No.: US 9,003,716 B1
(45) Date of Patent: *Apr. 14, 2015

(54) WIND RESISTANT MODULAR ISO BUILDING

(71) Applicant: KwikSpace Guam, Hagatna, GU (US)

(72) Inventors: Peter E. Gill, Tamuning, GU (US); Peter E. Gill, III, New York, NY (US); Aihua Tie, Mangilao, GU (US)

(73) Assignee: KwikSpace Guam, Hagatna, GU (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/147,621

(22) Filed: Jan. 6, 2014

(51) Int. Cl.
*E04H 5/06* (2006.01)
*E04H 1/12* (2006.01)
*E04B 1/348* (2006.01)
*E04H 1/00* (2006.01)
*E04H 9/14* (2006.01)

(52) U.S. Cl.
CPC *E04H 1/12* (2013.01); *E04B 1/348* (2013.01); *E04H 1/005* (2013.01); *E04H 9/14* (2013.01); *E04H 2001/1283* (2013.01)

(58) Field of Classification Search
CPC . E04H 2001/1283; E04H 1/12; E04H 1/1205; E04B 1/3483; E04B 1/62; E04B 1/342; E04B 1/348; E04B 2001/34892; E04B 2001/34389
USPC ......... 52/79.1, 79.7, 79.8, 79.9, 79.12, 79.13, 52/204.1, 211–213, 204.5, 204.53, 215, 52/653.1, 656.1, 656.2, 656.4, 656.5, 52/656.7
See application file for complete search history.

(56) References Cited

U.S. PATENT DOCUMENTS

| 3,452,498 | A | * | 7/1969 | Kinsey | 52/262 |
| 4,854,094 | A | * | 8/1989 | Clark | 52/79.1 |
| 5,389,167 | A | * | 2/1995 | Sperber | 156/71 |
| 5,511,908 | A | * | 4/1996 | Van Valkenburgh et al. | 405/129.55 |
| 5,706,614 | A | | 1/1998 | Wiley, Jr. et al. | |
| 5,735,639 | A | * | 4/1998 | Payne et al. | 405/129.57 |
| 5,996,293 | A | * | 12/1999 | Anderson et al. | 52/215 |
| 6,102,228 | A | * | 8/2000 | Rene | 220/1.5 |
| 6,155,747 | A | * | 12/2000 | Payne et al. | 405/129.55 |
| 6,513,670 | B2 | * | 2/2003 | Minkkinen | 220/1.5 |
| 6,675,540 | B1 | * | 1/2004 | Rokes | 52/143 |
| 7,441,671 | B2 | * | 10/2008 | McPhee | 220/1.5 |
| 7,827,738 | B2 | * | 11/2010 | Abrams et al. | 52/79.1 |
| 8,001,730 | B2 | * | 8/2011 | Wallance | 52/79.1 |
| 8,640,396 | B1 | * | 2/2014 | Gill et al. | 52/79.7 |
| 2009/0044466 | A1 | * | 2/2009 | Andres | 52/204.53 |
| 2010/0018131 | A1 | * | 1/2010 | Green | 52/79.5 |
| 2011/0258962 | A1 | * | 10/2011 | Peterson | 52/656.5 |
| 2012/0031020 | A1 | * | 2/2012 | Scalzi | 52/204.1 |
| 2013/0081346 | A1 | * | 4/2013 | Kulprathipanja et al. | 52/483.1 |

* cited by examiner

*Primary Examiner* — Beth Stephan
(74) *Attorney, Agent, or Firm* — Donald J. Ersler

(57) ABSTRACT

A wind resistant modular ISO building includes a first cargo container, a second cargo container, and a mounting system. The first and second cargo containers are joined to each other. Most of an inner lengthwise side wall of the first and second cargo containers is removed. At least two moment frames are attached to an inside of the first and second cargo containers. The end door of the first and second cargo containers are replaced with an end panel. Preferably, at least one door entrance and window system is formed in at least one of the lengthwise side walls.

18 Claims, 19 Drawing Sheets

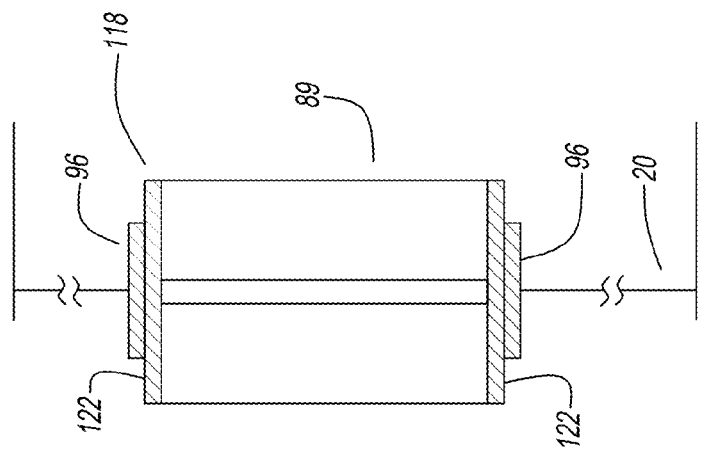
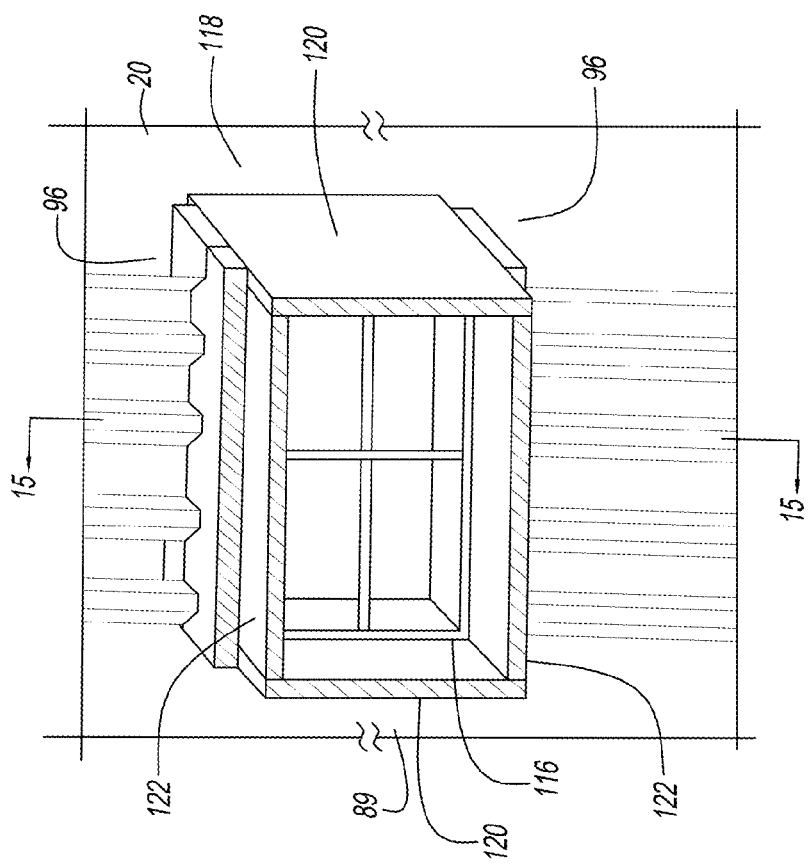

WIND RESISTANT MODULAR ISO BUILDING

BACKGROUND OF THE INVENTION

1. Field of the Invention

The present invention relates generally to temporary structures and more specifically to a wind resistant modular ISO building, which is fabricated from steel and specially designed to prevent rusting.

2. Discussion of the Prior Art

U.S. Pat. No. 5,706,614 to Wiley, Jr. et al. discloses a modular building having a steel shipping container core.

Accordingly, there is a clearly felt need in the art for a wind resistant modular ISO building, which is fabricated from steel and specially designed to prevent rusting; and which is suitable for surviving cyclones, hurricanes and typhoons.

SUMMARY OF THE INVENTION

The present invention provides a wind resistant modular ISO building, which is fabricated from steel and specially designed to prevent rusting. The wind resistant modular ISO building includes a first cargo container and a second cargo container. Each cargo container preferably includes a bottom frame, a top frame, four corner tubes, two lengthwise side walls, an end wall, a top plate, a floor plate and an end door. The bottom of the four corner tubes are attached to the four corners of the bottom frame and the top of the four corner tubes are attached to the top frame. The two lengthwise side walls are attached to sides of the top and bottom frames. The end wall is attached to one of the ends of the top and bottom frames. The two lengthwise side walls are fabricated from steel corrugated sheet. The end door is attached to an opposing end of the top and bottom frames. The top plate is attached to the top frame and the floor plate is attached to the bottom frame. A grappler pocket is retained in each corner of each frame.

A plurality of cement boards are attached to the floor plates of the first and second cargo containers with fasteners or the like. Each cement board preferably has a rectangular shape. It is preferable that some of the cement boards be attached across a seam between the first and second cargo containers in a lengthwise orientation. A length of the other cement boards would be parallel to a length of the first and second cargo containers. It is preferable to provide a gap between an edge of the cement boards attached to the floor plates and drywall mounted to an interior frame system. A gap is created between bottom of the drywall and the floor plates.

The end doors of the first and second cargo containers are replaced with an end panel. The end panel preferably includes a end plate and an inner stud frame. The inner stud wall includes a bottom horizontal stud, a top horizontal stud and a plurality of vertical studs. The bottom horizontal stud is attached to one end of the plurality of vertical studs with a plurality of fasteners and the top horizontal stud is attached to the other end of the plurality of vertical studs with the plurality of fasteners. The studs are attached to an inside surface of the end plate with a plurality of plate fasteners. The end plate is attached to an end frame of the cargo container with a plurality of frame fasteners.

At least one window system is formed in at least one of the lengthwise side walls of the wind resistant modular ISO building. Each window system preferably includes a window insert and a window support frame. The window support frame includes a window support frame and a window. A window opening is formed through one of the lengthwise side walls to receive the window support frame. Each window support frame includes two vertical support members and two horizontal support members. Each vertical support includes an inside vertical support member, an inside triangular member and an outside triangular member. The outside triangular member is attached to an outside of the angled portion of the lengthwise side wall the inside triangular member is attached to an inside of the angled portion. The inside vertical support member is attached to the inside triangular member with a plurality of fasteners. The horizontal support includes an inside support member and an outside support member. A plurality of trapezoidal cavities are formed in the inside and outside support members, to receive a cross section of the lengthwise side wall. The inside and outside support members are attached to each other with a plurality of fasteners.

The window insert preferably includes a pre-made window and a window sub-frame. The window sub-frame includes two vertical support members and two horizontal support members. One of the two horizontal support members is attached between a top of the two vertical support members and the other one of the two horizontal support members is attached between a bottom of the two vertical support members. The pre-made window is retained inside the window sub-frame.

At least one door entrance is formed in at least one of the lengthwise side walls of the wind resistant modular ISO building. Each door entrance preferably includes a door, a door frame and a sub-frame. The door is pivotally retained in the door frame. A door frame opening is cut through the lengthwise side wall. The door and the door frame are purchased ready made. The sub-frame includes a first vertical support and a second vertical support. The first and second vertical supports preferably include a trapezoidal support member, an end support member and at least one frame support member. The trapezoidal support member is secured to the corrugation. The end support member is secured to an end of the trapezoidal support member. The frame support member is attached to the trapezoidal support member. The door frame is secured between the first and second vertical support.

An interior frame system is located against an inside surface of the outer lengthwise side walls. The interior frame system includes a lower horizontal member, a plurality of vertical members and an upper horizontal member. One end of the plurality of vertical members are attached to the lower horizontal member and the other end of the plurality of vertical members are attached to the upper horizontal member. The lower horizontal member is attached to the floor plate and the top horizontal member is attached to the top frame. A plurality of drywall sheets are attached to a surface of the stud frame.

A bulkhead is typically formed in the side walls of cargo container to provide the cargo container with structural integrity. It is preferable to modify the bulkhead formed in the inside side walls of the first and second cargo containers. A first opening is created through a first end of the first and second cargo containers, between two adjacent grappler pockets. The first opening creates two vertical pillars, a bottom horizontal strip and a top horizontal strip. The two vertical pillars are located over the grappler pockets in the first and second cargo containers. The bottom and top horizontal strips are portions of the inside side wall that extends upward from the floor and downward from the ceiling.

A second opening is created through a second end of the first and second cargo containers, between two adjacent grappler pockets. The second opening creates two vertical pillars, a bottom horizontal strip and a top horizontal strip. The two vertical pillars are located over the grappler pockets in the first and second cargo containers. The bottom and top horizontal strips are portions of the inside side wall that extends upward from the floor and downward from the ceiling. A third opening is created between inner vertical pillars of the first and second openings. The third opening creates a horizontal support member, which extends downward from the ceiling between the outer pillars of the first and second openings.

Accordingly, it is an object of the present invention to provide a wind resistant modular ISO building, which is fabricated from steel and specially designed to prevent rusting; and which is suitable for surviving cyclones, hurricanes and typhoons.

These and additional objects, advantages, features and benefits of the present invention will become apparent from the following specification.

BRIEF DESCRIPTION OF THE DRAWINGS

FIG. 14 is a front perspective view of a window retained in a window support frame of a wind resistant modular ISO building in FIG. 10 in accordance with the present invention.

FIG. 15 is a cross sectional view of a window support frame retained in a window opening of a wind resistant modular ISO building in accordance with the present invention.

DETAILED DESCRIPTION OF THE PREFERRED EMBODIMENTS

Figure 1:
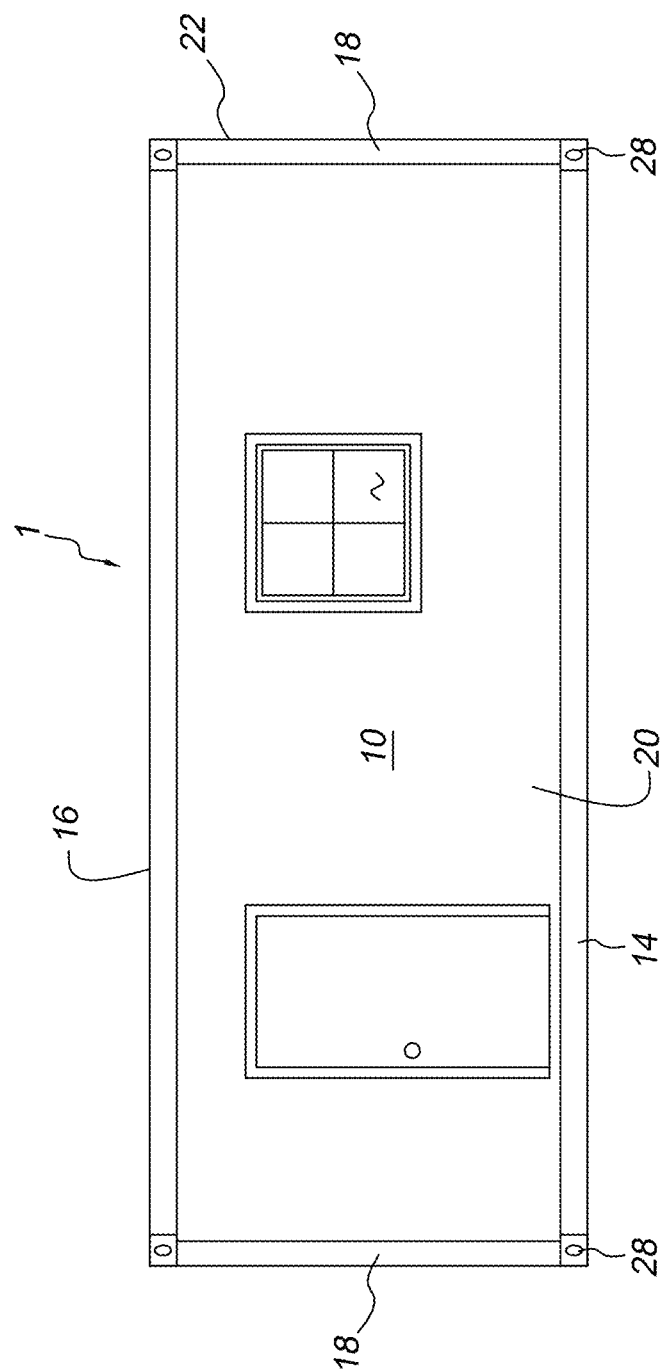
FIG. 1 is a side view of a wind resistant modular ISO building including a door and a window in accordance with the present invention.
Figure 3:
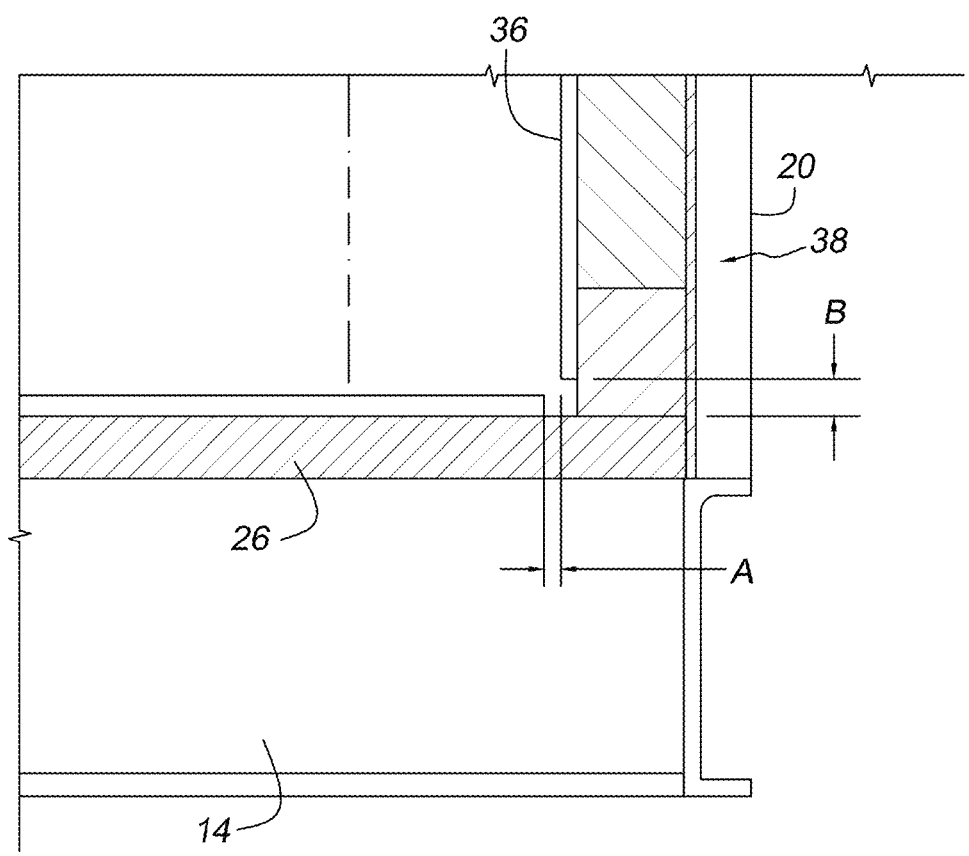
FIG. 3 is an enlarged end portion view of an inside of a lengthwise side wall of a cargo container illustrating gaps between drywall and flooring, and a stud frame and the flooring of a wind resistant modular ISO building in accordance with the present invention.
Figure 4:
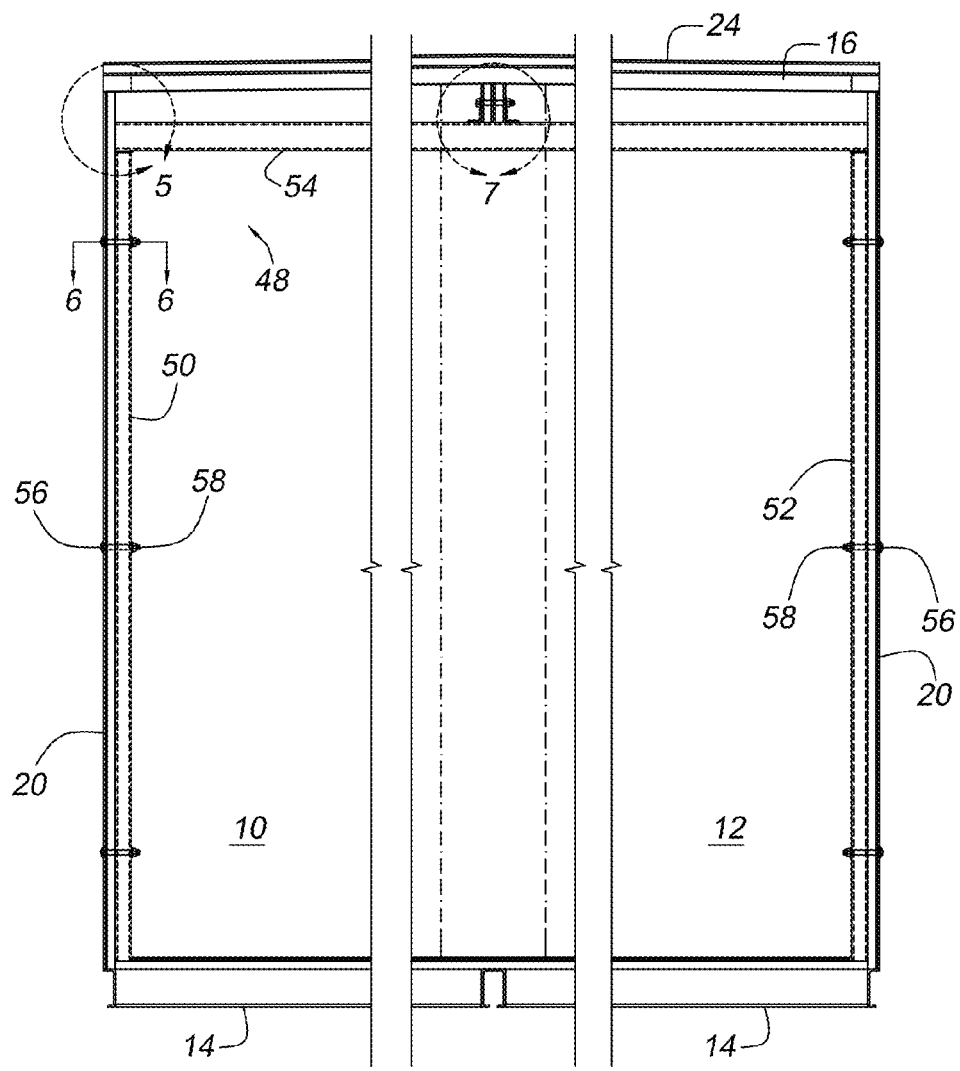
FIG. 4 is an end view of a moment frame attached to lengthwise side walls of first and second cargo containers of a wind resistant modular ISO building in accordance with the present invention.
Figure 5:
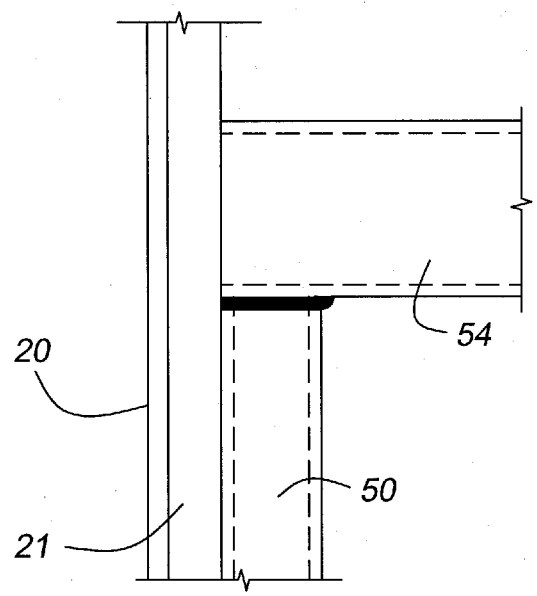
FIG. 5 is an enlarged end view of a vertical moment member attached to a horizontal moment member of a moment frame of a wind resistant modular ISO building in accordance with the present invention.
Figure 6:
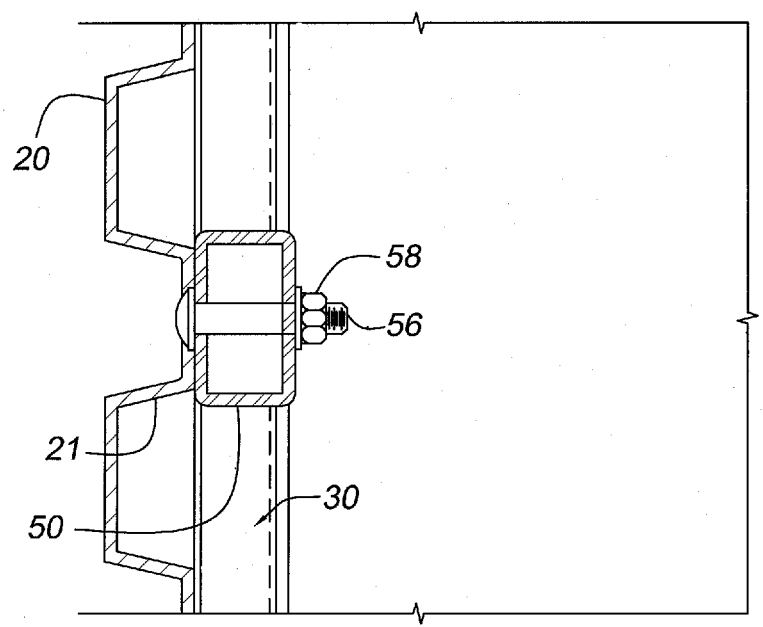
FIG. 6 is an enlarged top view of a vertical moment member of a moment frame attached to a lengthwise side wall of a wind resistant modular ISO building in accordance with the present invention.
Figure 7:
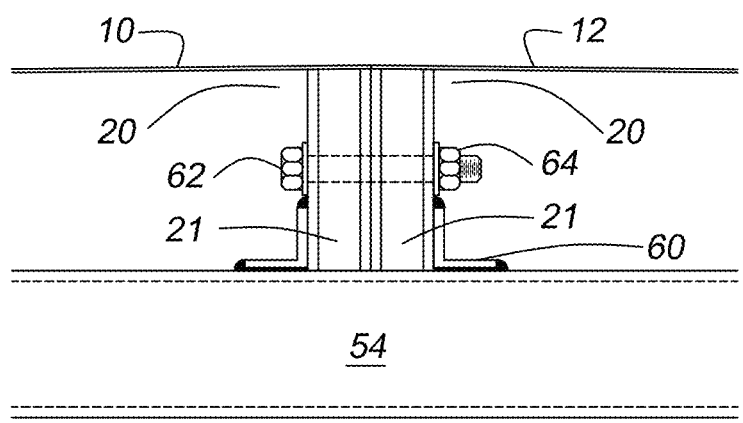
FIG. 7 is an enlarged end view of a top of a first cargo container attached to a top of a second cargo container of a wind resistant modular ISO building in accordance with the present invention.
Figure 21:
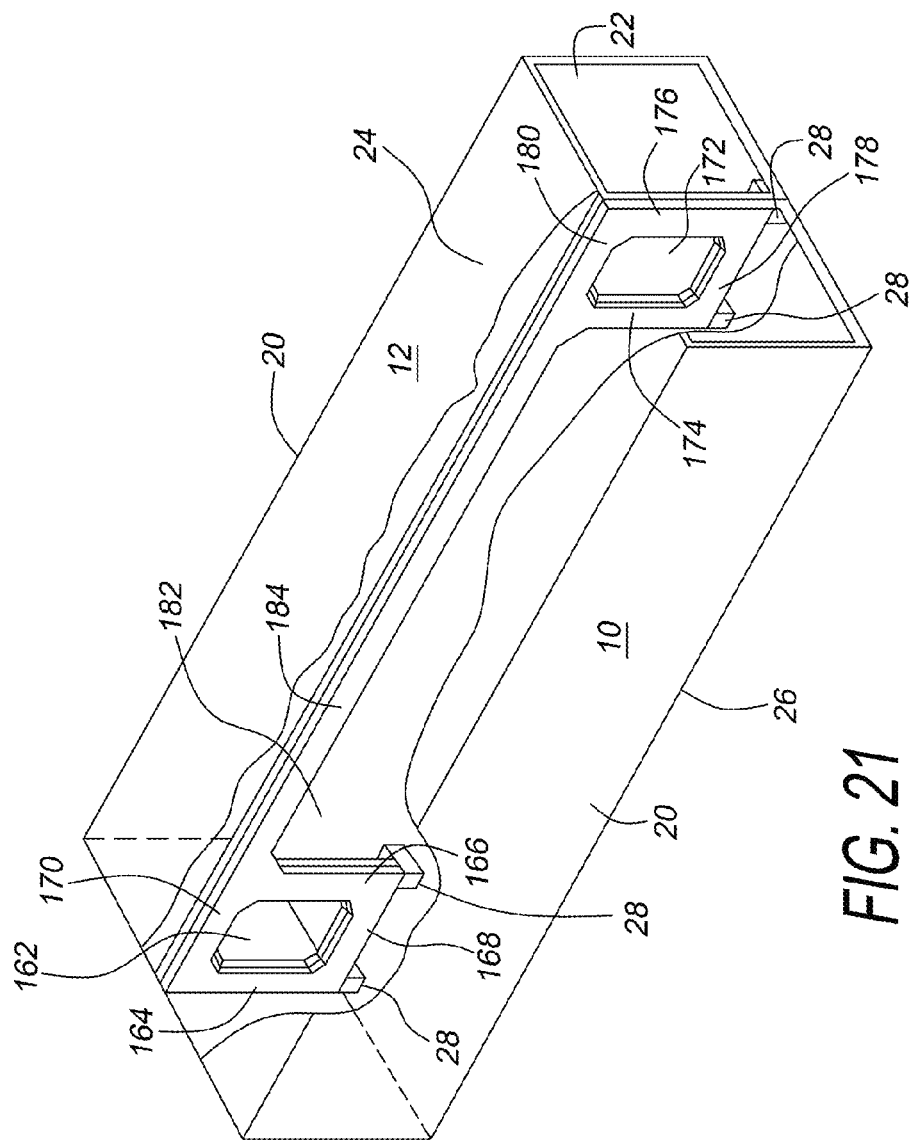
FIG. 21 is a perspective cutaway view of a wind resistant modular ISO building illustrating openings formed through bulkheads in inside lengthwise side walls of first and second cargo containers in accordance with the present invention.

With reference now to the drawings, and particularly to FIG. 1, there is shown a side view of a wind resistant modular ISO building 1. With reference to FIG. 21, the wind resistant modular ISO building 1 includes a first cargo container 10 and a second cargo container 12. With reference to FIGS. 1, 3 and 4, each cargo container 10, 12 includes a bottom frame 14, a top frame 16, four corner tubes 18, two lengthwise side walls 20, an end wall 22, a top plate 24, a floor plate 26 and an end door (not shown). The bottom of the four corner tubes 18 are attached to the four corners of the bottom frame 14 and the top of the four corner tubes 18 are attached to the top frame 16. The two lengthwise side walls 20 are attached to the top and bottom frames 14, 16. The end wall 22 is attached to one of the ends of the top and bottom frames 14, 16. The two lengthwise side walls 20 are fabricated from a steel corrugated sheet. The end door is attached to an opposing end of the top and bottom frames 14, 16. The top plate 24 is attached to the top frame 16 and the floor plate 22 is attached to the bottom frame 14. A grappler pocket 28 is retained in each corner of each frame 14, 16. The top and bottom frames 14, 16 are preferably welded to each other to create the wind resistant modular ISO building 1.

Figure 2:
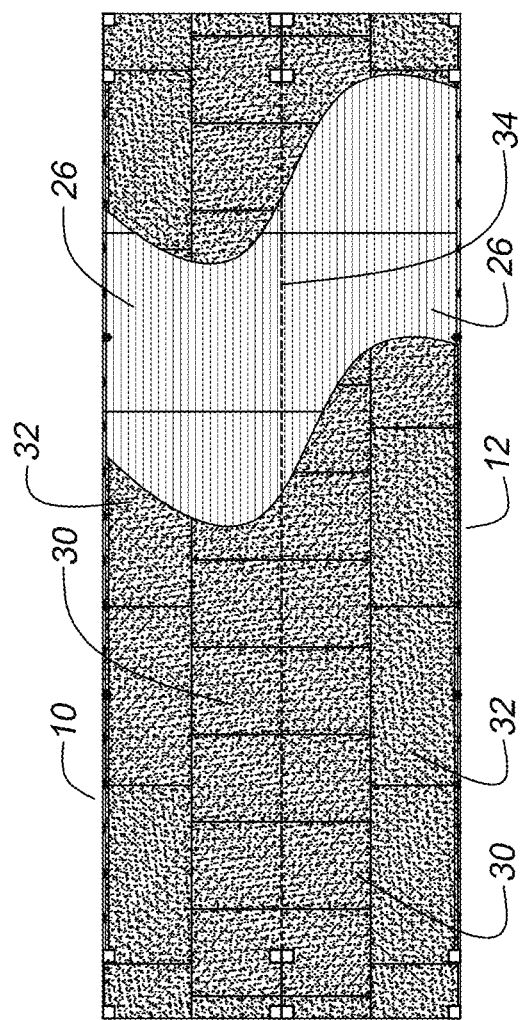
FIG. 2 is a top view of a plurality of cement boards arranged to form a floor for a wind resistant modular ISO building in accordance with the present invention.

With reference to FIG. 2, a plurality of cement boards 30, 32, are attached to the floor plates 26 of the first and second cargo containers with fasteners or the like. Each cement board preferably has a rectangular shape. It is preferable that the cement boards 30 are attached across a seam 34 between the first and second cargo containers 10, 12 in a lengthwise orientation. A length of the other cement boards 32 would be parallel to a length of the first and second cargo containers 10, 12. With reference to FIG. 3, it is preferable that an edge of the cement boards 32 be located a gap "A" from drywall 36 mounted to an interior frame system 38 attached to the floor plates 26. A bottom of the drywall 36 is also preferably spaced a gap "B" from the floor plates 26. It is preferable that the gaps "A" and "B" have a value of ½ inch, but other values could also be used. Without gaps "A" and "B" damage would probably occur to the cement boards 30, 32 and/or dry wall 36 during transport of the wind resistant modular ISO building 1.

With reference to FIGS. 4-7, at least two moment frames are attached to an inside of the first and second cargo containers 10, 12. Each moment frame 48 includes a first vertical moment member 50, a second vertical moment member 52 and a horizontal moment member 54. A first end of the horizontal moment member 52 is attached to a top of the first vertical moment member preferably with welding and a second end of the horizontal moment member 54 is attached to a top of the second vertical moment member 52 preferably with welding. The first vertical moment member 50 is attached to one of the plurality of corrugations 21 of the lengthwise side wall 20 of the first cargo container 10 with a plurality of bolts 56 and a plurality of nuts 58. The second vertical moment member 52 is attached to one of the plurality of corrugations 21 on the lengthwise side wall 20 of the second cargo container 12 with the plurality of bolts 56 and the plurality of nuts 58. An upper portion of two adjacent corrugations 21 of the first and second lengthwise wall 16 are attached to a top of the horizontal moment member 54 by welding a pair of angle members 60 thereto. The two adjacent corrugations 21 are preferably attached to each other with a plurality of bolts 62 and nuts 64.

Figure 8:
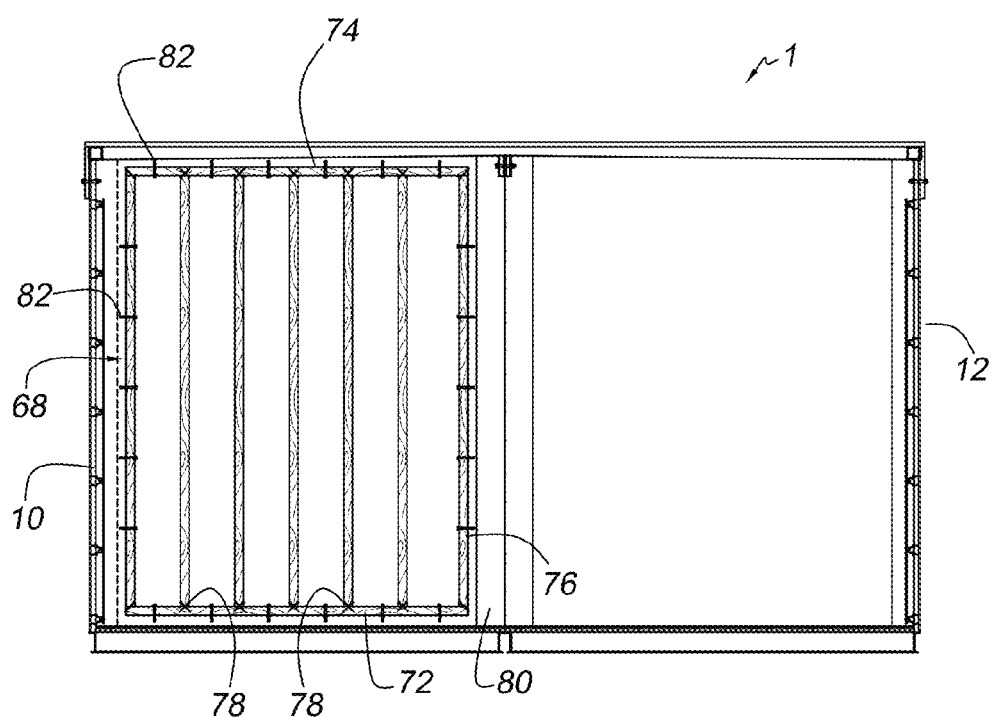
FIG. 8 is a front end view of a cargo container with an inner stud frame replacing an end door of a wind resistant modular ISO building in accordance with the present invention.
Figure 9:
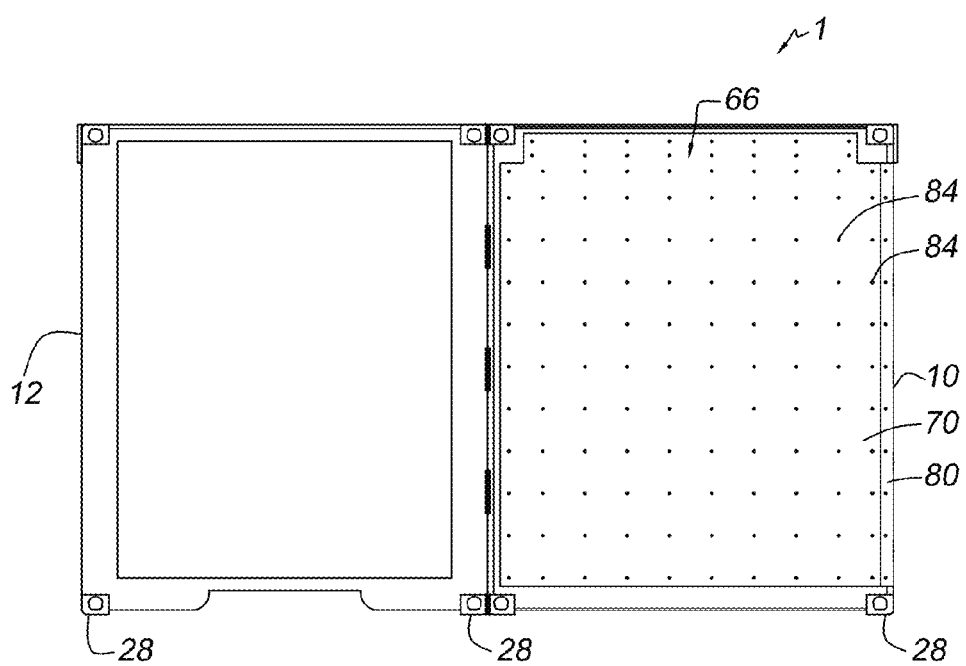
FIG. 9 is a rear end view of a cargo container with an end plate, before installation of an inner stud frame of a wind resistant modular ISO building in accordance with the present invention.

With reference to FIGS. 8-9, the end doors of the first and second cargo containers 10, 12 are replaced with an end panel 66. The end panel 66 preferably includes an inner stud frame 68 and an end plate 70. The inner stud wall 68 includes a bottom horizontal stud 72, a top horizontal stud 74 and a plurality of vertical studs 76. The bottom horizontal stud 72 is attached to one end of the plurality of vertical studs 76 with a plurality of fasteners 78 and the top horizontal stud 74 is attached to the other end of the plurality of vertical studs 76 with the plurality of fasteners 78. An outer perimeter of the inner stud frame 68 is attached to an inner perimeter of an end frame 80 of the cargo container 10, 12 with a plurality of fasteners 82. An inside surface of the end plate 70 is attached to an outer surface of the inner stud frame 68 and the end frame 80 with a plurality of fasteners 84.

With reference to FIGS. 10-13, at least one window system 86 is formed in at least one of the lengthwise side walls 20 of the wind resistant modular ISO building 1. Each window system 86 preferably includes a window support frame 88 and a window insert 89. A window opening is formed through one of the lengthwise side walls 20 to receive the window support frame 88. Each window support frame 88 includes a first vertical support 90, a second vertical support 92 and two horizontal supports 96. Each vertical support 90, 92 includes an inside vertical support member 98, an inside triangular member 100 and an outside triangular member 102. The outside triangular member 102 is attached to an outside of angled portion 23 of the lengthwise side wall 20 and the inside triangular member 100 is attached to an inside of the angled portion 23. The inside and outside triangular members 100, 102 are attached to each other with a plurality of fasteners 104. The inside vertical support member 98 is attached to the inside triangular member 100 with a plurality of fasteners 106.

The horizontal support 96 includes an inside support member 108 and an outside support member 110. A plurality of trapezoidal notches 112 are formed in the inside and outside support members 108, 110 to receive a cross section of the lengthwise side wall 20. The inside and outside support members 108, 110 are attached to each other with a plurality of fasteners 114. With reference to FIGS. 14-15, the window insert 89 preferably includes a pre-made window 116 and a window sub-frame 118. The window sub-frame 118 includes two vertical support members 120 and two horizontal support members 122. One of the two horizontal support members 122 is attached between a top of the two vertical support members 120 and the other one of the two horizontal support members 122 is attached between a bottom of the two vertical support members 120. The pre-made window 116 is retained inside the window sub-frame 118.

Figure 10:
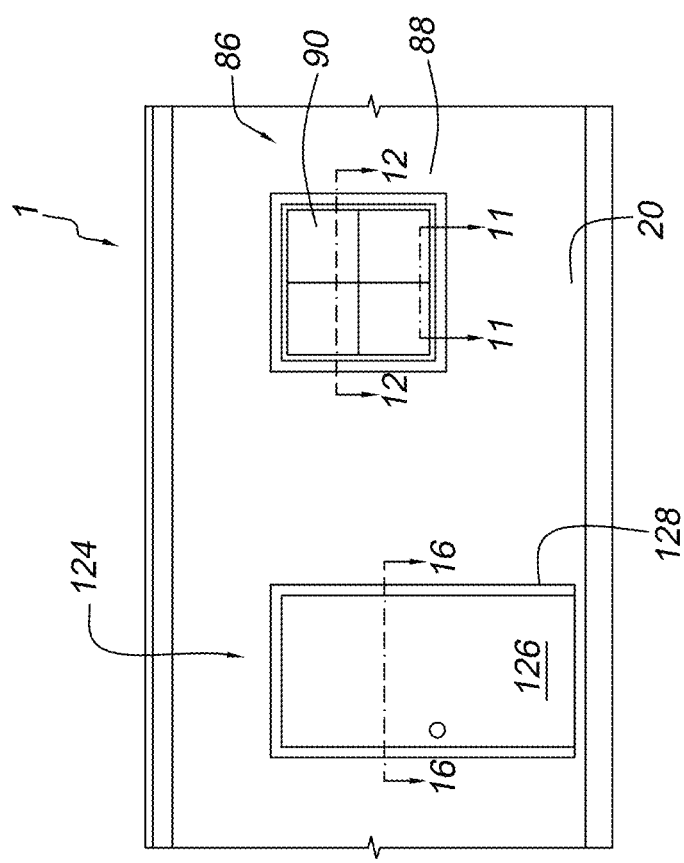
FIG. 10 is a portion of a side view of a wind resistant modular ISO building including a door and a window with cutting plane lines for FIGS. 11, 12 and 16 in accordance with the present invention.
Figure 11:
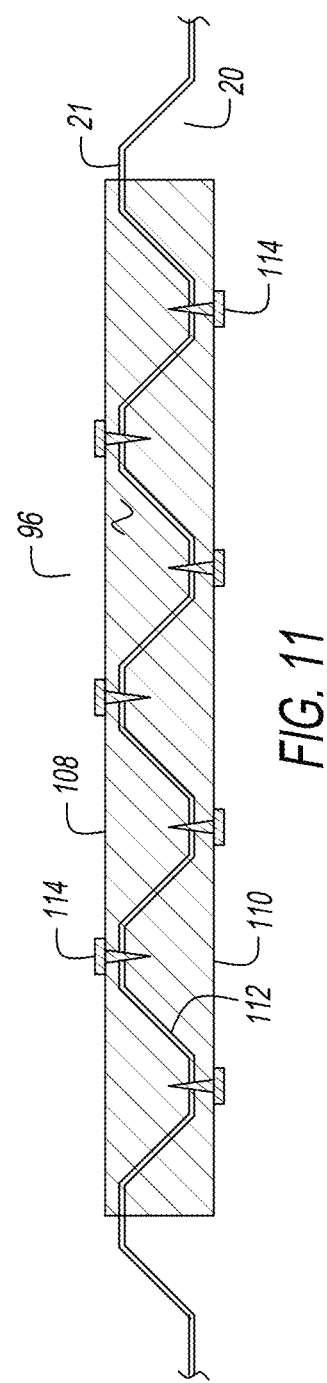
FIG. 11 is an enlarged cross sectional view cut through a lower portion of a window cutout of a wind resistant modular ISO building in FIG. 10 in accordance with the present invention.
Figure 12:
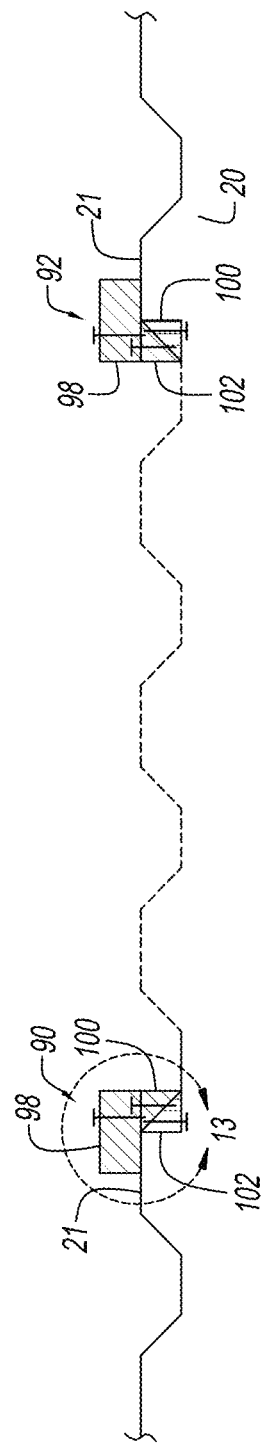
FIG. 12 is an enlarged cross sectional view cut through a middle portion of a window cutout of a wind resistant modular ISO building in FIG. 10 in accordance with the present invention.
Figure 13:
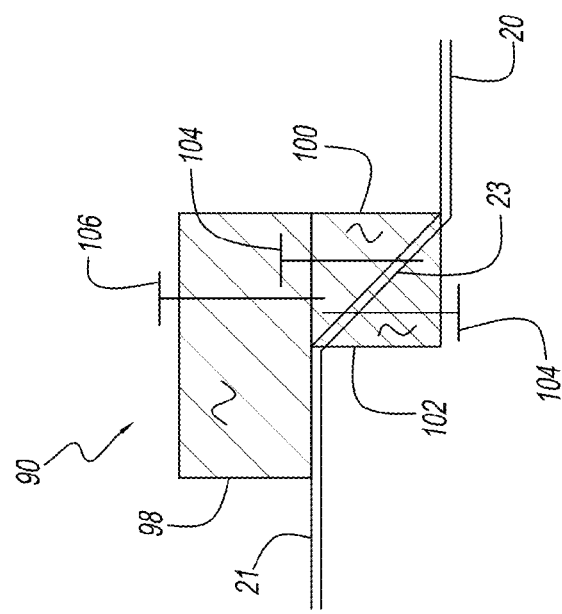
FIG. 13 is an enlarged view of a portion of FIG. 12 of a wind resistant modular ISO building in accordance with the present invention.
Figure 16:
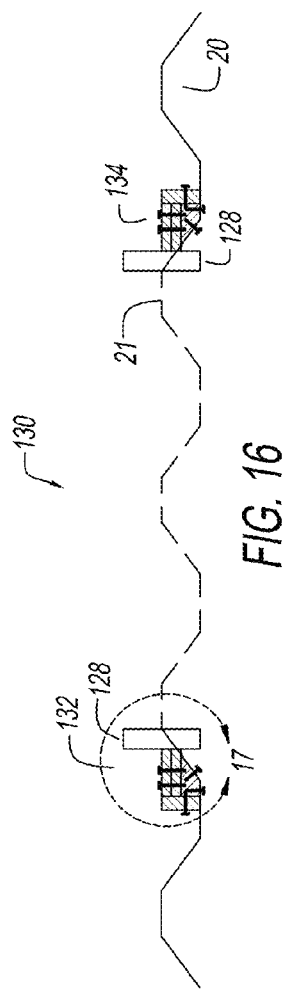
FIG. 16 is an enlarged cross sectional view cut through a door cutout of a wind resistant modular ISO building in FIG. 10 in accordance with the present invention.
Figure 17:
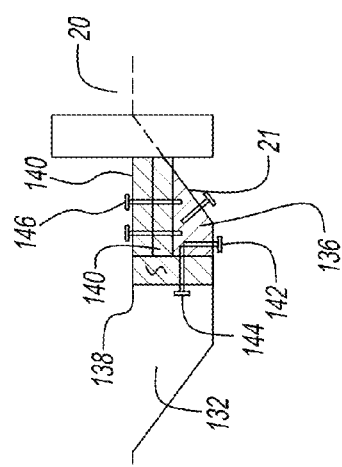
FIG. 17 is an enlarged view of a portion of FIG. 16 of a wind resistant modular ISO building in accordance with the present invention.

With reference to FIGS. 10 and 16-17, at least one door entrance 124 is formed in at least one of the lengthwise side walls 20 of the wind resistant modular ISO building 1. Each door entrance 124 preferably includes a door 126, a door frame 128 and a sub-frame 130. The door 126 is pivotally retained in the door frame 128. A door frame opening is cut through the lengthwise side wall 20. The door 126 and the door frame 128 are purchased ready made. The sub-frame 130 includes a first vertical support 132 and a second vertical support 134. The first and second vertical supports 132, 134 preferably include a trapezoidal support member 136, an end support member 138 and at least one frame support member 140. The trapezoidal support member 136 is shaped to be flush with an inside of a corrugation 21. At least one fastener 142 is used to secure the trapezoidal support member 136 to the corrugation 21. The end support member 138 is secured to an end of the trapezoidal support member 136 with at least one fastener 144. The frame support member 140 is attached to the trapezoidal support member 136 with at least one fastener 146. The door frame 128 is secured to the first and second vertical supports 132, 134.

Figure 18:
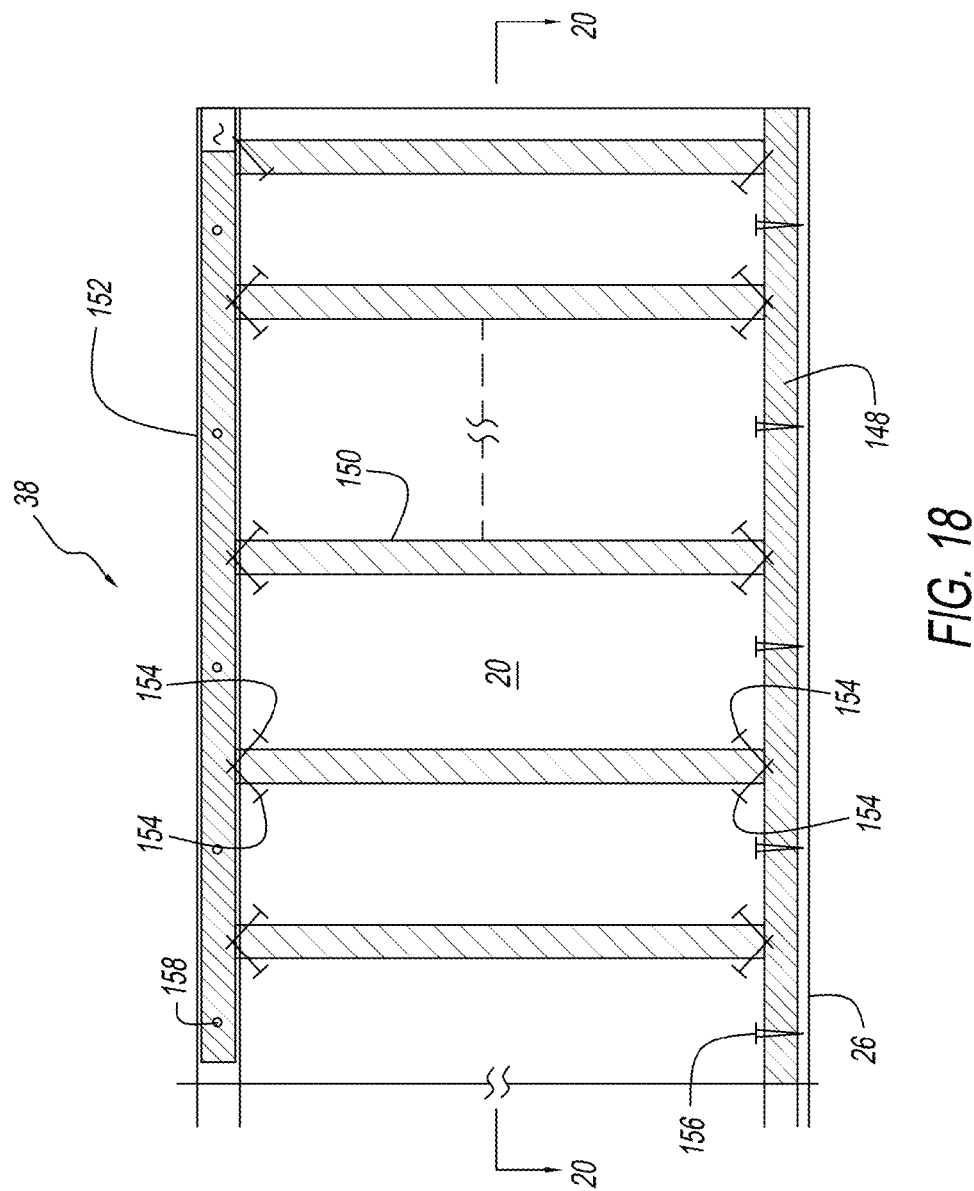
FIG. 18 is a front view of an interior frame system of a wind resistant modular ISO building with a cutting plane line for FIG. 20 in accordance with the present invention.
Figure 19:
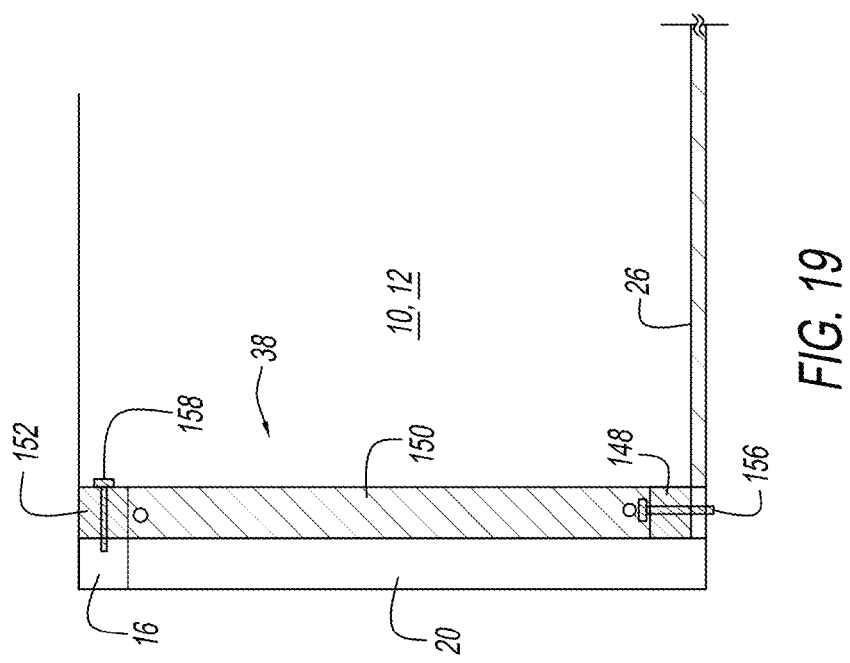
FIG. 19 is an end view of an interior frame system of a wind resistant modular ISO building in accordance with the present invention.
Figure 20:
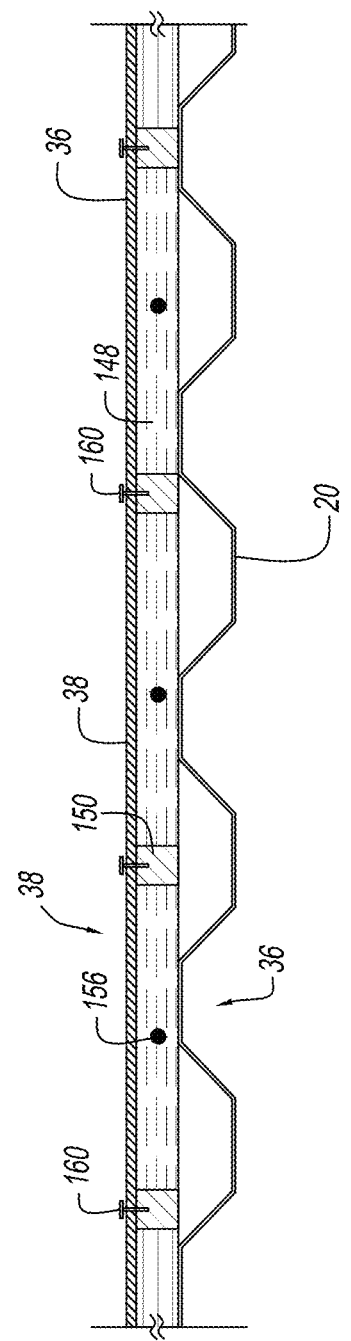
FIG. 20 is a cross sectional top view of an interior frame system cut through FIG. 18 of a wind resistant modular ISO building in accordance with the present invention.

With reference to FIGS. 18-20, an interior frame system 38 is located adjacent an inside surface of the outer lengthwise side walls 20. The interior frame system 38 includes a lower horizontal member 148, a plurality of vertical members 150 and an upper horizontal member 152. One end of the plurality of vertical members 150 are attached to the lower horizontal member 148 with a plurality fasteners 154 and the other end of the plurality of vertical members 150 are attached to the upper horizontal member 152 with the plurality of fasteners 154. The lower horizontal member 148 is attached to the floor plate 26 with a plurality of fasteners 156. The top horizontal member 152 is attached to the top frame 16 with a plurality of fasteners 158. The plurality of drywall sheets 36 are attached to an outer surface of the interior frame system 38 with a plurality of fasteners 160.

Figure 22:
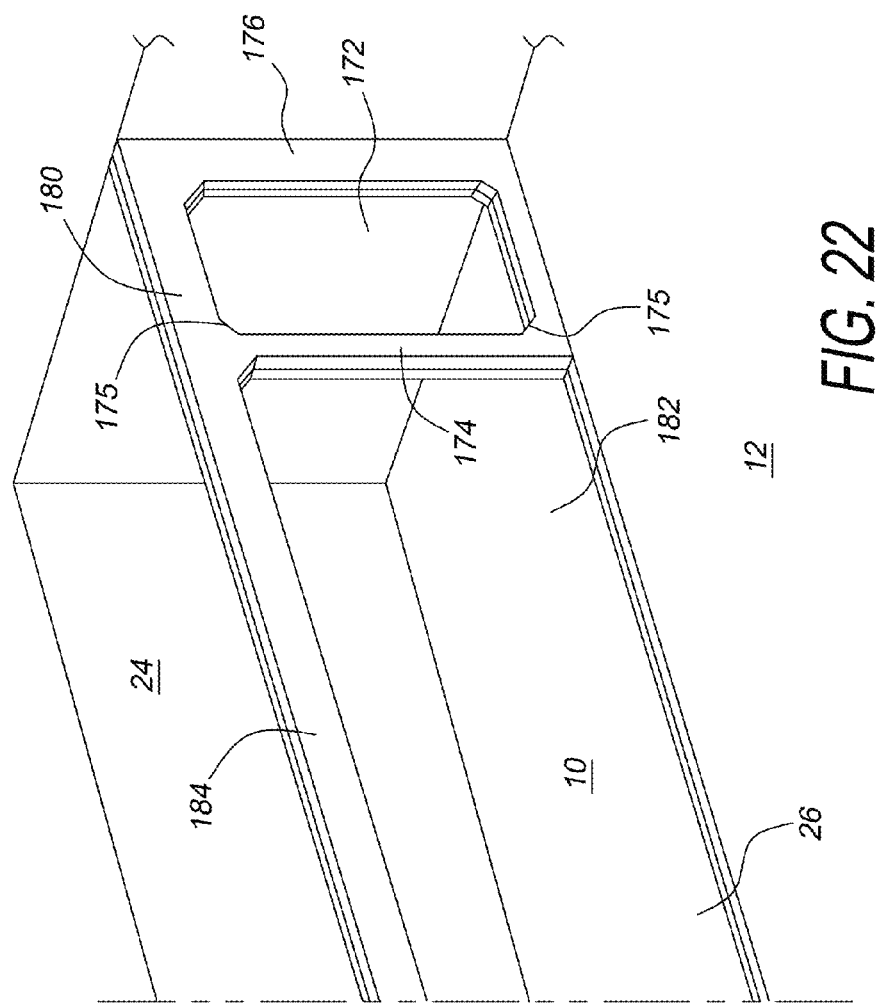
FIG. 22 is an enlarged perspective view of an inside of a wind resistant modular ISO building illustrating openings formed through bulkheads in inside lengthwise side walls of the first and second cargo containers in accordance with the present invention.

With reference to FIGS. 21-22, a bulkhead is typically formed in the side walls of a cargo container to provide the cargo container with structural integrity. The bulkhead includes two reinforced pillars located over grappler pockets 28. In order to make the wind resistant modular ISO building 1 more usable, it is preferable to remove as much of the inside walls 20 of the first and second cargo containers 10, 12. However, removing too much of the inside walls 20 will result in wind resistant modular ISO building 1 collapsing.

A first opening 162 is created through a first end of the first and second cargo containers 10, 12, between two adjacent grappler pockets 28. The first opening 162 creates two vertical pillars 164, 166, a bottom horizontal strip 168 and a top horizontal strip 170. The two vertical pillars 164, 166 are located over the two adjacent grappler pockets 28 in the first and second cargo containers 10, 12. The bottom and top horizontal strips 168, 170 are portions of the inside side wall 20 that extend upward from the floor 26 and downward from the top plate 24.

A second opening 172 is created through a second end of the first and second cargo containers 10, 12, between two adjacent grappler pockets 28. The second opening 172 creates two vertical pillars 174, 176, a bottom horizontal strip 178 and a top horizontal strip 180. The two vertical pillars 174, 176 are located over the two adjacent grappler pockets 28 in the first and second cargo containers 10, 12. The bottom and top horizontal strips 178, 180 are portions of the inside side wall 20 that extend upward from the floor 26 and downward from the top plate 24. A chamfer 175, a radius or the like is preferable formed in an inside corner of a junction of the vertical support members 174, 176 and the horizontal members 178, 180; and also the vertical support members 162, 164 and horizontal members 166, 168. A third opening 182 is created between vertical pillars 166, 174 of the first and second openings. The third opening 182 creates a horizontal support member 184, which extends downward from the top plate 24 between the outer pillars 166, 174.

The bottom frames 14 of the first and second cargo containers are supported by the mounting system (not shown). The wind resistant modular ISO building 1 is transportable from a manufacturing location to a use location without damaging the structure or contents in the wind resistant modular ISO building 1. Typically, manufacturers of cargo container buildings attach the two cargo containers together at the job site and install the interior of the cargo container building at the job site, instead of transporting a completed cargo container building to the job site.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A wind resistant modular ISO building comprising:
   a first cargo container having a first outer lengthwise side wall, a first inner lengthwise side wall, a first top plate and a first floor plate;
   a second cargo container having a second outer lengthwise side wall, a second inner lengthwise side wall, a second top plate and a second floor plate, said lengthwise side walls being a steel corrugated sheet, said first cargo container being secured to said second cargo container; and
   at least one window system includes a window support frame and a window insert, said window support frame includes a first vertical support, a second vertical support and two horizontal supports, said window insert includes a window and a window sub-frame, each vertical support includes an inside vertical support member, an inside triangular member and an outside triangular member, said outside triangular member is attached to an outside angled portion of said lengthwise side wall, said inside triangular member is attached to an inside angled portion of said lengthwise side wall, said inside vertical support member is attached to said inside triangular member, wherein a window cutout is formed through at least one of said first and second lengthwise side walls, one of said two horizontal supports is mounted adjacent a top of the window cutout, the other one of said two horizontal supports is mounted adjacent a bottom of the window cutout, said first vertical support is mounted adjacent a first side of the window cutout, said second vertical support is mounted adjacent a second side of the window cutout, said window is retained in an interior perimeter of said window sub-frame, said window sub-frame is inserted into the window cutout.

2. The wind resistant modular ISO building of claim 1 wherein:
   each one of said horizontal supports includes an inside horizontal support member and an outside horizontal support member, a plurality of inside trapezoidal notches are formed in said inside horizontal support member, a plurality of outside trapezoidal notches are formed in said outside horizontal support member, said plurality of trapezoidal notches are sized to receive the steel corrugated sheet, said inside and outside horizontal support members are attached to each other with a plurality of fasteners.

3. The wind resistant modular ISO building of claim 1 wherein:
   said window sub-frame includes two vertical sub-support members and two horizontal sub-support members, said two vertical sub-support members are attached to said two horizontal sub-support members to form a rectangular shape.

4. The wind resistant modular ISO building of claim 1, further comprising:
   at least one moment frame being retained on an inside perimeter of said first and second cargo containers, each one of said at least one moment frame includes a first vertical moment member, a second vertical moment member and a horizontal moment member, said first vertical moment member is secured to an inside surface of said first outer lengthwise side wall, said second vertical moment member is secured to an inside surface of said second outer lengthwise side wall, said top junction is attached to a top of said horizontal moment member.

5. The wind resistant modular ISO building of claim 1, further comprising:
   an end door of said cargo container is replaced with an end panel, said end panel includes an end plate and an inner stud frame.

6. The wind resistant modular ISO building of claim 1, further comprising:
   a plurality of cement boards are attached over a seam between said first and second floor plates, such that a first end of said plurality of cement boards are attached to said first floor plate, a second end of said plurality of cement boards are attached to said second floor plate.

7. A wind resistant modular ISO building comprising:
   a first cargo container having a first outer lengthwise side wall, a first inner lengthwise side wall, a first top plate and a first floor plate;
   a second cargo container having a second outer lengthwise side wall, a second inner lengthwise side wall, a second top plate and a second floor plate, said lengthwise side walls being a steel corrugated sheet, said first cargo container being secured to said second cargo container; and
   at least one door entrance includes a door, a door frame and a sub-frame, said door is pivotally retained in said door frame, said sub-frame includes a first vertical support and a second vertical support, each vertical support includes a trapezoidal support member, an end support member and at least one frame support member, said trapezoidal support member is secured to the inside surface of the steel corrugated sheet, said end support member is secured to an end of the trapezoidal support member, said at least one frame support member is attached to said trapezoidal support member perpendicular to said end support member, wherein a door frame opening is cut through said lengthwise side wall, said first and second vertical supports are attached adjacent first and second sides of said door frame opening, an angled portion of said trapezoidal support member is secured to said lengthwise side wall, each side of said door frame is secured between said first and second vertical supports.

8. The wind resistant modular ISO building of claim 7, further comprising:
at least one moment frame being retained on an inside perimeter of said first and second cargo containers, each one of said at least one moment frame includes a first vertical moment member, a second vertical moment member and a horizontal moment member, said first vertical moment member is secured to an inside surface of said first outer lengthwise side wall, said second vertical moment member is secured to an inside surface of said second outer lengthwise side wall, said top junction is attached to a top of said horizontal moment member.

9. The wind resistant modular ISO building of claim 8, further comprising:
an end door of said cargo container is replaced with an end panel, said end panel includes an end plate and an inner stud frame.

10. The wind resistant modular ISO building of claim 7, further comprising:
a plurality of cement boards are attached over a seam between said first and second floor plates, such that a first end of said plurality of cement boards are attached to said first floor plate, a second end of said plurality of cement boards are attached to said second floor plate.

11. The wind resistant modular ISO building of claim 10, further comprising:
an interior frame system is mounted adjacent an inside surface of said lengthwise side wall, said interior frame system includes a lower horizontal member, a plurality of vertical members and an upper horizontal member, one end of said plurality of vertical members are attached to said lower horizontal member and the other end of said plurality of vertical members are attached to said upper horizontal member, said lower horizontal member is attached to said floor plate, said upper horizontal member is attached to an upper frame of said cargo container.

12. The wind resistant modular ISO building of claim 11, further comprising:
at least one drywall board is attached to a surface of said interior frame system, a vertical gap is created between a bottom of said at least one drywall board and said plurality of cement boards.

13. The wind resistant modular ISO building of claim 12, further comprising:
said plurality of cement boards are located laterally from said at least one drywall board to create a horizontal gap therebetween.

14. A wind resistant modular ISO building comprising:
a first cargo container having a first outer lengthwise side wall, a first inner lengthwise side wall, a first top plate and a first floor plate;
a second cargo container having a second outer lengthwise side wall, a second inner lengthwise side wall, a second top plate and a second floor plate, said lengthwise side walls being a steel corrugated sheet, said first cargo container being secured to said second cargo container; and
at least one window system includes a window support frame and a window insert, said window support frame includes a first vertical support, a second vertical support and two horizontal supports, each one of said horizontal supports includes an inside horizontal support member and an outside horizontal support member, a plurality of inside trapezoidal notches are formed in said inside horizontal support member, a plurality of outside trapezoidal notches are formed in said outside horizontal support member, said plurality of trapezoidal notches are sized to receive the steel corrugated sheet, said inside and outside horizontal support members are attached to each other with a plurality of fasteners, said window insert includes a window and a window sub-frame,
wherein a window cutout is formed through at least one of said first and second lengthwise side walls, one of said two horizontal supports is mounted adjacent a top of the window cutout, the other one of said two horizontal supports is mounted adjacent a bottom of the window cutout, said first vertical support is mounted adjacent a first side of the window cutout, said second vertical support is mounted adjacent a second side of the window cutout, said window is retained in an interior perimeter of said window sub-frame, said window sub-frame is inserted into the window cutout.

15. The wind resistant modular ISO building of claim 14, further comprising:
at least one moment frame being retained on an inside perimeter of said first and second cargo containers, each one of said at least one moment frame includes a first vertical moment member, a second vertical moment member and a horizontal moment member, said first vertical moment member is secured to an inside surface of said first outer lengthwise side wall, said second vertical moment member is secured to an inside surface of said second outer lengthwise side wall, said top junction is attached to a top of said horizontal moment member.

16. The wind resistant modular ISO building of claim 14, further comprising:
an end door of said cargo container is replaced with an end panel, said end panel includes an end plate and an inner stud frame.

17. The wind resistant modular ISO building of claim 14, further comprising:
a plurality of cement boards being attached over a seam between said first and second floor plates, such that a first end of said plurality of cement boards are attached to said first floor plate, a second end of said plurality of cement boards are attached to said second floor plate.

18. The wind resistant modular ISO building of claim 17, further comprising:
an interior frame system is mounted adjacent an inside surface of said lengthwise side wall, said interior frame system includes a lower horizontal member, a plurality of vertical members and an upper horizontal member, one end of said plurality of vertical members are attached to said lower horizontal member and the other end of said plurality of vertical members are attached to said upper horizontal member, said lower horizontal member is attached to said floor plate, said upper horizontal member is attached to an upper frame of said cargo container.

\* \* \* \* \*